United States Patent [19]
Rosenkrantz

[11] Patent Number: 5,704,509
[45] Date of Patent: Jan. 6, 1998

[54] FULL CONTACT FLOATING ROOF

[75] Inventor: David Jon Rosenkrantz, Emmaus, Pa.

[73] Assignee: Allentech, Inc., Bethlehem, Pa.

[21] Appl. No.: 436,574

[22] Filed: May 8, 1995

[51] Int. Cl.[6] ................................................. B65D 88/34
[52] U.S. Cl. .................. 220/216; 220/218; 220/622; 52/582.1; 52/580; 403/288; 403/335; 403/337; 403/338; 285/405
[58] Field of Search .................................. 220/216–227, 220/622, 620, 628; 52/578, 580, 582.1, 588.1; 403/288, 335–338; 285/23, 325, 405

[56] References Cited

U.S. PATENT DOCUMENTS

| | | | |
|---|---|---|---|
| 2,448,926 | 9/1948 | Stack | 20/2 |
| 2,720,948 | 10/1955 | Pajak | 189/34 |
| 2,970,716 | 2/1961 | McCammon | 220/218 |
| 2,974,822 | 3/1961 | Trimble | 220/218 |
| 3,013,103 | 12/1961 | Pettler | 174/35 |
| 3,024,879 | 3/1962 | Kandra | 189/36 |
| 3,206,895 | 9/1965 | Ridder | 52/15 |
| 3,476,422 | 11/1969 | Campbell | 287/189.36 |
| 3,574,449 | 4/1971 | Rosenberg | 52/578 X |
| 3,910,452 | 10/1975 | Szasz | 220/226 |
| 4,120,123 | 10/1978 | Knudson | 52/588.1 X |
| 4,254,188 | 3/1981 | Campbell et al. | 428/594 |
| 4,433,514 | 2/1984 | Henges, Jr. et al. | 52/588.1 X |
| 4,643,933 | 2/1987 | Picken | 428/116 |
| 4,647,335 | 3/1987 | Wagner | 156/500 |
| 4,695,495 | 9/1987 | Ault | 428/73 |
| 4,931,340 | 6/1990 | Baba et al. | 428/73 |

FOREIGN PATENT DOCUMENTS

| | | | |
|---|---|---|---|
| 966430 | 4/1975 | Canada | 220/216 |
| 2683211 | 5/1993 | France | 220/216 |
| 2120705 | 12/1971 | Germany | 52/582.1 |
| 2325171 | 11/1974 | Germany | 220/216 |
| 3141797 | 4/1983 | Germany | 220/216 |
| 526972 | 9/1957 | Italy | 403/338 |

OTHER PUBLICATIONS

Std. 1000–S Petrex Inc. specification, Typical Selection and Details of the Petrex Internal Floating Roof System, Oct. 15, 1981.
Std. 1001–S Petrex Inc. specification, General Plan for a 52 Ft. Diameter Tank, date unknown.
Std. 1001–S Petrex Inc. specification, Panel Joining Detail, Jan. 10, 1990.
Std. 2003–S Petrex Inc. specification, Primary and Secondary Seal Detail, Nov. 3, 1988.
Std. 3909–S Petrex Inc. specification, Leg Assembly Detail, Jan. 10, 1990.
Std. 4203–S Petrex Inc. specification, 30" Diameter Manway, Jul. 14, 1992.
Std. 4304–S Petrex Inc. specification, Column Well Cover Assembly, Sep. 28, 1981.
Std. 5205–S Petrex Inc. specification, Ground Cable Assembly, Jul. 14, 1992.
Std. 5201–S Petrex Inc. specification, Anti–Rotation Cable Assembly, Sep. 28, 1981.
5313–S Petrex Inc. specification, Automatic Gage Float Well, Jan. 21, 1985.
Std 5420–S Petrex Inc. specification, PV Vent, Sep. 28, 1981.
Std. 5512–S Petrex Inc. specification, Gage Funnel, Sep. 28, 1981.
Std. 6610–S Petrex Inc. specification, Shell Vent, Sep. 28, 1981.
Std. 6630–SPetrex Inc. specification, 8' Ø Center Vent, Sep. 28, 1981.
Std. 6909–S Petrex Inc. specification, Foam Dam Assembly, Jul. 14, 1992.

Primary Examiner—Allan N. Shoap
Assistant Examiner—Nathan Newhouse
Attorney, Agent, or Firm—Foley & Lardner

[57] ABSTRACT

A full contact floating roof for a storage vessel includes a plurality of panels wherein each panel includes a core disposed between upper and lower skins. A plurality of closures are provided wherein each closure is secured to perimeter edges of a panel by welding the closure to at least one of the upper and lower skins. A plurality of fasteners connect adjacent closures thereby forming the floating roof.

44 Claims, 16 Drawing Sheets

FULL CONTACT FLOATING ROOF

BACKGROUND OF THE INVENTION

The present invention relates in general to full contact floating roofs, and in particular to full contact floating roofs that are constructed of composite panels.

Many industrial processes involve large quantities of volatile liquids such as water, gasoline, alcohol, etc. The industries practicing these processes store a wide range of liquids in large storage vessels located throughout the world. These vessels are typically constructed of metal (steel, stainless steel or aluminum) or reinforced concrete, depending on the size, location, the material stored and the industrial process generating or using the liquid. The petrochemical industry alone stores hundreds of millions of gallons of organic chemicals, including alcohols, gasolines, jet fuels, oxidants, solvents and process products. Many of these storage vessels have a fixed roof either integral with the vessel or retrofitted over the vessel for the dual purposes of keeping contaminants (such as water and dust) out of the stored product and for reducing evaporative losses of the stored product (for economic and regulatory reasons). Vessels with a roof are commonly referred to as "covered storage tanks".

If the physical and chemical properties of the liquids stored in these vessels are such that the liquid will evaporate readily at ambient pressure and temperature, an additional control device is often used to minimize the losses from evaporation. For many hydrocarbon based liquids, the escaping vapors can present a health, safety or fire hazard. Vapors from flammable liquids will form an explosive mixture with air when the appropriate blend of vapor and oxygen exists. Many liquids, particularly those containing sulfur, present an objectionable odor when allowed to freely evaporate.

An additional evaporative control device commonly used is an impervious buoyant structure which floats on the liquid surface. These structures are commonly referred to as "floating roofs". If the vessel is a "covered storage tank", then the floating roof is called an "internal floating roof". If the vessel does not have a roof over it, then the floating roof is called an "external floating roof". External floating roofs serve the dual purposes of keeping weather and airborne contaminants out of the stored product and reducing evaporative losses.

Many different types of floating roofs have been manufactured and most can fit into one of two broad categories: vapor-space and full-contact floating roofs. Vapor-space floating roofs typically have a plurality of buoyant members supporting an impervious membrane above the liquid surface. Any mechanical joints, seams or holes in the membrane can leak vapors from the vapor space below the membrane to the ambient atmosphere above the membrane. Leaks in the membrane allow vapors to escape from the entire reservoir of vapors under the floating roof. Full-contact floating roofs have the vapor retention membrane on the liquid surface. Full-contact floating roofs do not have a vapor space underneath the membrane and are an improved method of controlling evaporation losses and minimizing explosive mixtures.

Existing designs for full contact floating roofs fall into two broad categories: monolithic and segmented. Monolithic full contact floating roofs are constructed inside the vessel in one large unit with no mechanical joints, seams or breaks in the part of the roof in contact with the product. One example of this design is an all welded steel floating roof resembling a frying pan. The edge of this style "pan" roof is high enough so that liquid cannot flood over the top edge and sink the roof. Segmented full contact floating roofs are shop fabricated into modules that are field assembled inside the vessel. Each segment typically comprises a composite panel with edge closures that facilitate assembly. A composite panel is a structural component comprising two strong relatively thin skins (usually metallic) separated by and bonded to a lightweight material of a thickness usually many times greater than the thickness of the skins. For segmented full contact floating roofs, the skins are commonly aluminum of 0.015 to 0.050 inches thick and the core is commonly 1½" to 3" thick polyurethane foam or 1½" to 3" thick aluminum honeycomb made from 0.003" to 0.005" thick aluminum foil in ¾" to 1" hexagonal cells.

Previous designs for segmented full contact floating roofs made from composite materials each have one or more of the following seven perceived flaws which are eliminated by the present invention:

1. "Full contact" is not achieved due to gaps between composite panel modules.

It is common knowledge in the floating roof industry and has been documented by the federal EPA (Environmental Protection Agency) that seam losses account for approximately ⅓ of the total evaporative losses in a tank equipped with a "vapor-space" floating roof. This "seam" loss occurs because mechanical joints are less than 100 percent effective. If a full-contact floating roof is to eliminate the "seam" source of evaporation loss, the design must eliminate any vapor-space at the joints between modules. Inter-module joints having no vapor space are a feature of this invention.

2. The modules have adhesives exposed to and in direct contact with the product.

Modern society is dependent on a wide variety of hydrocarbon-based chemicals for energy, transportation, food, pharmaceuticals, materials, clothing and many other basic needs. The chemical industry is constantly deriving new chemicals and using new chemical combinations with new properties that are used and stored in large quantities. Many of these chemicals are stored in vessels that have floating roofs. If the floating roof uses chemical adhesives as a sealant or in an exposed structural joint, the compatibility of the adhesive with these new chemicals must be investigated. Long term compatibility is essential for safe, economic and environmentally sound operation of the floating roof. Unfortunately, it is impossible to know if a given chemical will attack an adhesive without actual long term experience. Failures of state-of-the-art adhesives used on full contact floating roofs have resulted in the expensive removal, de-gassing and consequent hazardous disposal of the failed roof. The elimination of adhesives which are exposed to the product and to product vapors is a feature of this invention.

3. The modules utilize adhesives in structural applications.

The critical area of many structures, and floating roof structures in particular, is the joints between structural modules. If the joint does not develop the full strength of the adjoining modules, the overall strength, durability, safety and useful life of the floating roof is compromised. The tensile, compressive, shear and bearing strengths, toughness, creep, hardness, ductility, temperature resistance, permeability and electrical conductivity of the adhesives used to join together existing state-of-the-art modules has not been demonstrated to be equal to that of the parent materials used in the module. This is particularly evident when adhesives are used to join metallic members together. Adhesives are chemical materials and are less resistant to attack by chemicals than metallic or mineral materials. Adhesives can lose their mechanical properties as they age and are subject to attack by aggressive chemicals. This invention eliminates structural joints in modules using adhesives where the adhesive directly resists the applied forces. This invention also eliminates structurally joining together modules using adhesives.

4. The use of adhesives in joining the modules to their connecting members using existing state-of-the-art technology and practice undesirably eliminates the possibility of pressure testing the completed module for leaks.

The current state-of-the-art fabrication and adhesives application methods use ambient temperature, slow-curing, hand-applied adhesives that remain permanently pliable. To maintain marginal dimensional stability during preliminary adhesive curing, fasteners are placed into drilled holes in the modules. In addition, adhesive is manually spread along the joints and along the outside corners of the modules. If air pressure were to be applied during fabrication of the modules, leaks would be created through the still pliable adhesive, weak sections of adhesive joints and drilled holes. It is therefore not possible to leak test each module during current state-of-the-art fabrication. Leak testing each module is critical to guaranteeing that the module will not fail during use by allowing the ingress of stored product into the interior of the module. If liquid gets inside a module, buoyancy and freeboard are reduced and the product can and has been shown to attack the skin-to-core bond resulting in partial or complete delamination of the skins from the core. Failures of this type result in excessive emissions, compromised safety, and expensive and hazardous removal and disposal work. This invention makes it possible to leak test each module using air pressure during standard fabrication.

5. The use of adhesives in joining the modules to their connecting members using existing state-of-the-art technology and practice does not result in sufficiently dimensionally accurate and stable modules to allow complete shop fabrication of all modules without field modifications and application of adhesives or sealants.

Adhesives exhibit shrinkage and creep during curing, during variations in ambient conditions and when under mechanical stress. Some mechanical stress is unavoidable during normal handling of a module when fabricating, packaging, shipping, unloading, field assembling and normal usage. This shrinkage and creep is of different magnitude than that of the materials being joined. The degree of motion possible in the adhesively bonded joints of current state-of-the-art floating roof modules makes it impossible to shop fabricate uniform modules for assembly in large quantities without field adjustment. Field adjustment involving adhesives and/or sealants is typically less uniform and successful than applications in a controlled shop environment and is therefore subject to premature leakage or structural failure. This invention eliminates field adjustment of modules.

6. The modules do not form a continuously conductive surface.

During normal operation of storage vessels containing liquids, static electric charges are generated. These charges can be anywhere in or on the liquid surface. If the liquid or vapor is flammable, these static electric charges must be conducted safely to ground to avoid a spark and possible explosion. The use of gaskets or adhesives between metallic modules insulates the modules from each other and compromises the ability of a floating roof to conduct stray static charges from their place of generation to a suitable ground shunt or cable. Nonmetallic modules must have distinct conductive paths throughout the roof. This invention maintains complete conductivity throughout the entire module-to-module joint.

7. Liquid product can pour over the top of existing modules and flood the floating roof.

During operation and maintenance of a floating roof, concentrated and distributed loads are imposed on the floating roof. Existing module designs provide excess buoyancy (freeboard) by virtue of the overall thickness of the composite material forming the modules being somewhat greater than the displacement of the module when floating. When a load is placed on the interior of a floating roof, the load is distributed 360 degrees around the load point and is supported by buoyant modules all around. When a load is placed at the edge of the floating roof, buoyant support is provided by modules only behind the load, toward the center of the vessel. Considerably less support is available for safely supporting edge loads. Edge loading occurs at the periphery of a floating roof and also at penetrations through the floating roof. Penetrations are often required for storage vessel structural members and operation or maintenance equipment. The buoyancy of existing state-of-the-art designs is limited by the composite panel part of the module's thickness. This invention makes available additional buoyancy over and above the composite panel part of the module's thickness for safe operation of the floating roof.

SUMMARY OF THE INVENTION

It is an object of the present invention to provide a full contact floating roof which overcomes the above-discussed problems of prior floating roofs.

This and other objects and advantages of the invention are achieved by a full contact floating roof comprising a plurality of panels, each panel comprising a core disposed between upper and lower skins; a plurality of closures wherein each closure is secured to perimeter edges of a panel by welding the closure to at least one of the upper and lower skins; and a plurality of fasteners for connecting adjacent closures.

Preferably, each closure includes a generally vertical section extending above the upper skin and below the lower skin and at least one generally horizontal section extending substantially parallel to one of the upper and lower skin wherein the horizontal section is welded to the one of the upper and lower skin.

More preferably, each closure includes another generally horizontal section extending substantially parallel to the other of the upper and lower skin and welded to the other of the upper and lower skin.

In one embodiment, the plurality of closures includes a first and second plurality of closures, each closure of the first plurality of closures having a hook in a portion of the vertical section that extends below the lower skin, each closure of the second plurality of closures having a pin in a portion of the vertical section that extends below the lower skin wherein the pin is disposed in the hook.

In another embodiment, the roof further comprises a cap channel fitted over portions of the vertical sections of adjacent closures, which extend above the upper skin.

In yet another embodiment, each closure of the first plurality of closures includes a second pin in the portion of the section that extends above the upper skin and each closure of the second plurality of closures includes a second hook in the portion of the vertical section that extends above the upper skin and wherein the second pin is disposed in the second hook.

In still another embodiment, the roof further comprises a midbeam disposed between vertical sections of adjacent closures wherein the fasteners extend through the midbeam.

Preferably, the midbeam extends vertically above the vertical sections of the adjacent closures.

In a further embodiment, the plurality of panels includes a first and a second plurality of panels and a thickness of the first plurality of panels is greater than a thickness of the second plurality of panels.

In another embodiment, the vertical section of each of the plurality of closures includes a recess formed therein for receiving part of a gasket.

In another embodiment, a full contact floating roof comprises a plurality of panels, each panel comprising a core disposed between upper and lower skins; a plurality of closures wherein each closure is secured to perimeter edges of a panel by welding the closure to at least one of the upper and lower skins; and a cap channel for connecting adjacent closures.

In one aspect of the invention, the plurality of panels are connected in a running-brick pattern.

In another aspect of the invention, the plurality of panels are connected in a herringbone pattern.

In yet another aspect of the invention, the plurality of panels includes a first plurality of panels of a first thickness and a second plurality of panels of a second thickness which is greater than the first thickness and wherein the second plurality of panels are arranged around a perimeter of the first plurality of panels.

In still a further aspect of the invention, the roof is rectangular, the plurality of panels are rectangular and arranged in rows and columns, and one of the rows and columns are separated by a plurality of midbeams disposed between vertical sections of adjacent closures.

A method of making a full contact floating roof for a vessel comprises the steps of providing a plurality of panels, each panel comprising a core disposed between upper and lower skins; providing a plurality of closures; securing the closures to perimeter edges of the panels by welding the closures to at least one of the upper and lower skins; and connecting together the plurality of panels by fastening adjacent closures.

Preferably, the securing step is performed external to the vessel and the connecting step is performed inside the vessel.

Further objects, features and advantages of the invention will become apparent from the following detailed description taken in conjunction with the accompanying drawing.

BRIEF DESCRIPTION OF THE DRAWINGS

The drawings are hereby expressly made a part of the specification.

DETAILED DESCRIPTION OF THE PREFERRED EMBODIMENTS

Figure 1:
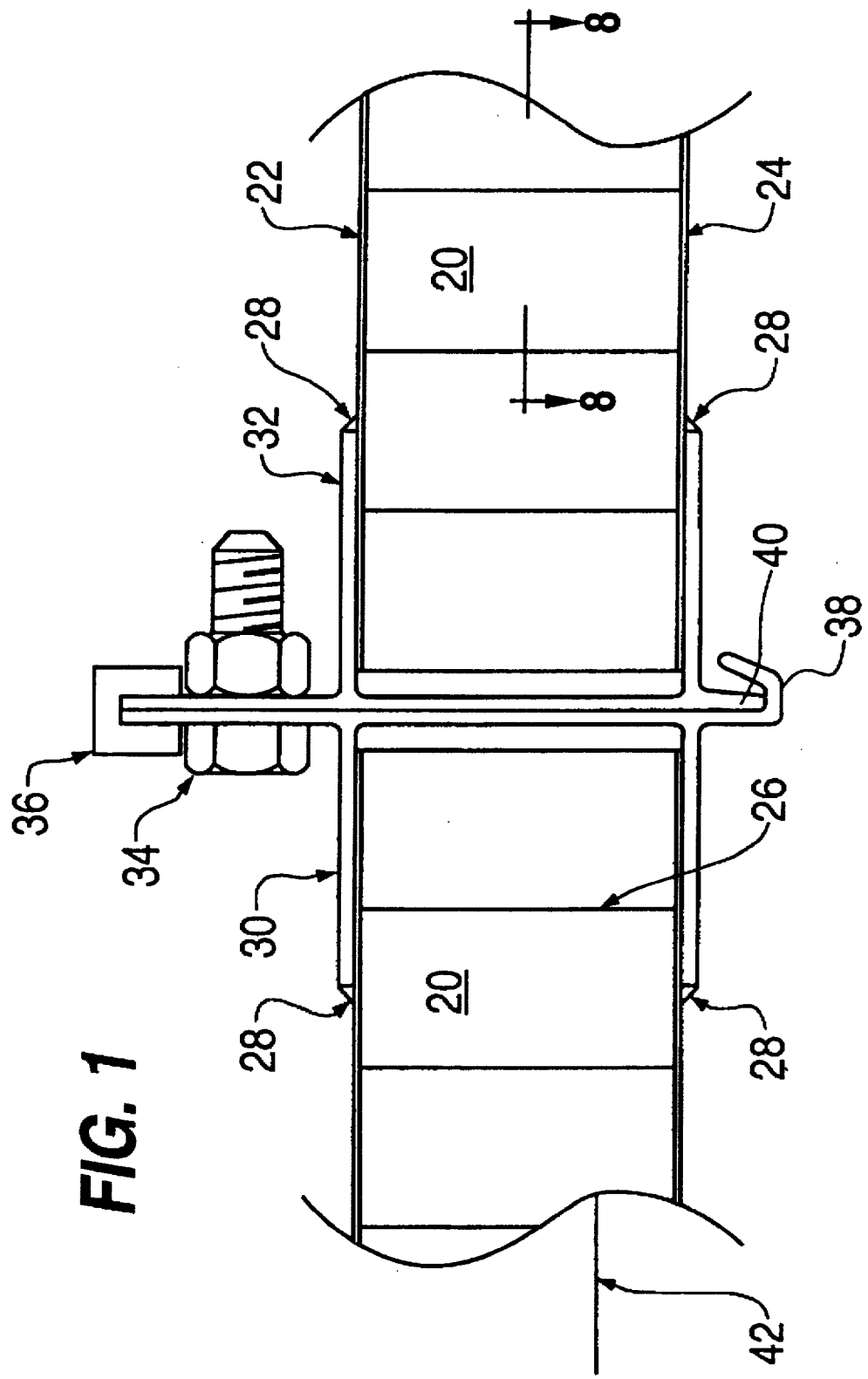
FIG. 1 shows a first embodiment of the invention.

Referring now to FIG. 1, a first embodiment of a basic module for the invention is a rectangular composite panel 20, preferably 60"×120" and 1½" to 3" thick with upper and lower skins 22, 24, preferably 0.040" thick aluminum, attached to a core 26, preferably 1" hexagonal aluminum foil, using heat cured epoxy. The panel edges have attached to them extruded modified channel type shapes or closures 30, 32. Closures 30, 32 are preferably metallic, and more preferably aluminum. The closures 30, 32 are attached to the perimeter of the panel 20 by weld beads 28, preferably formed using rapid continuous MIG welding at 60 to 80 inches per minute, and include manual seal welds (TIG welding) at the four corners. The structural integrity of the composite panel 20 depends on the interior bonding system between the skins and the core being undisturbed, except directly under the weld bead 28. In this regard, it may be necessary to utilize weld wire with a lower than usual melting temperature.

Preferably, the panels 20 are pressure tested at 15 to 50 psig after welding to insure liquid tightness. Close manufacturing tolerances, preferably plus or minus 0.030", are required to allow for easy and accurate field fit during the assembly of large floating roofs. Such close manufacturing tolerances may be obtained by rigidly clamping the panel 20 and all four closures 30, 32 in a steel fixture, and then welding the closures to the panel. The steel fixture includes a support frame and machined steel blocks that are aligned and shimmed to fit the particular size of panel being welded.

The design of the closures 30, 32 maintains a clean vertical surface for the full height of the panel 20 to facilitate metal-to-metal module joints. The closures 30, 32 then extend above the panel 20, preferably at least 1 inch above the panel. Fasteners, for example, stainless steel bolts 34, are placed through mating holes, preferably punched, in the vertical flanges of the closures 30, 32 of adjacent panels 20. The lower edges of the closures 30, 32 are preferably designed with an interlocking hook 38 and pin 40 labyrinth type mechanical seal that develops the full strength of the panel 20. By not requiring fasteners below the panel 20, the invention eliminates contact between fasteners and the stored product. The approximate product level in the tank is shown at 42.

Preferably, a cap channel 36 is placed over the completed panel joints. The cap channel 36 may be made of an elastomeric or metallic material. The cap channel 36 helps seal the joint and adds structural strength to the joint. If of sufficient strength, the cap channel 36 may be used without bolts 34. In such a case, the term "fastener" used in the claims would include structure such as the cap channel 36.

The outer panels 112 on a floating roof designed to fit inside a non-rectangular vessel (See FIGS. 13–15) are preferably shop cut to the appropriate shape and have closures 30, 32 of a similar design welded on in a similar manner as rectangular panels. For the nonstandard panels 112, the closure may be fixed in and flexed into the desired shape in a fixture having a series of manually adjustable, threaded supports. The closure is clamped to the supports and each of the supports is threaded out to conform the closure to the desired shape. A shop cut panel 112 is then welded to the closures.

Figure 2:
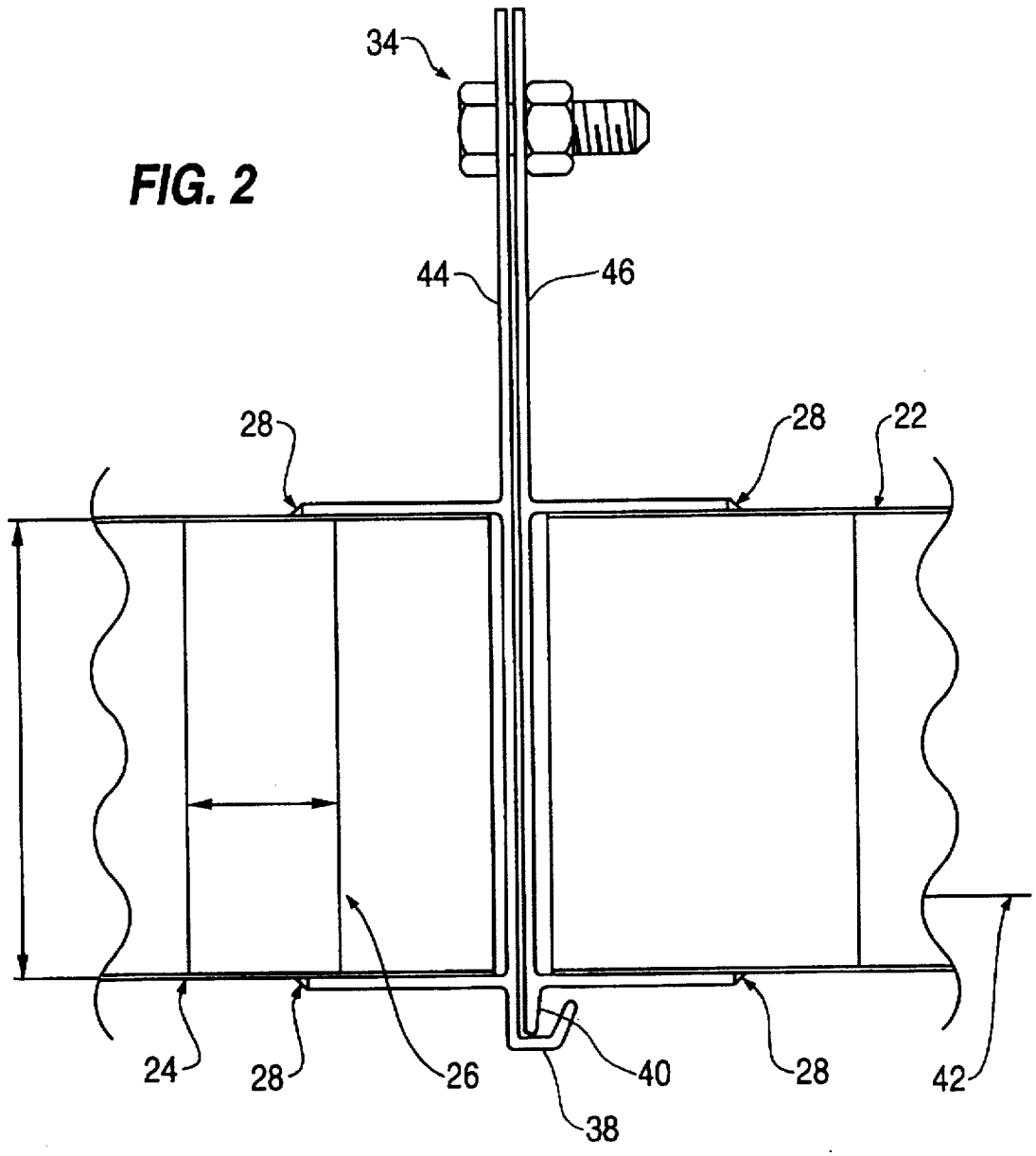
FIG. 2 shows a second embodiment of the invention.

FIG. 2 shows a second embodiment of the invention. Throughout the Figures, like reference numerals refer to like features. In FIG. 2, the closures 44, 46 include a hook 38 and pin 40, respectively. The vertical sections of the closures 44, 46 extend further above the upper skin 22 than the vertical sections of the closures 30, 32 shown in FIG. 1. The advantages of having the vertical sections of the closures 44, 46 extend further above the upper skin 22 are to: 1) provide additional buoyancy and freeboard for safely supporting higher loads, 2) provide additional buoyancy and freeboard when floating on liquids of lower than normal specific gravity, 3) provide additional buoyancy and freeboard when used in conjunction with higher than normal product turbulence or wave action, 4) separate the fastener and/or sealant and/or gasket further from the liquid and vapor to minimize any deleterious chemical effects, 5) increase the section modulus and strength of the module at a modest material cost, and 6) enhance the ease of fabrication and field assembly.

Figure 3:
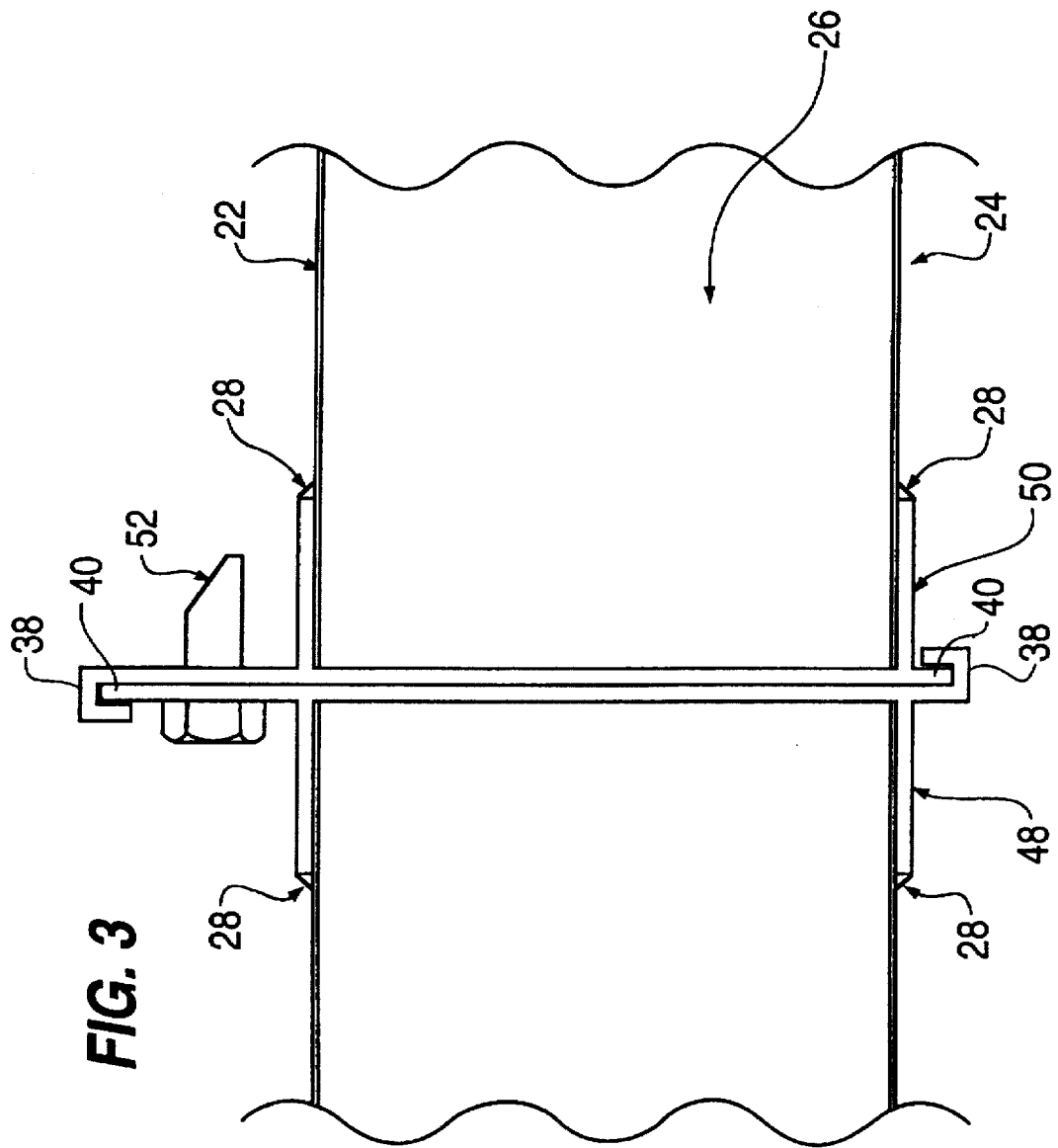
FIG. 3 shows a third embodiment of the invention.

FIG. 3 shows a third embodiment of the invention. In this embodiment, a closure 48 has a hook 38 at the bottom and a pin 40 at the top and a closure 50 has a pin 40 at the bottom and a hook 38 at the top. The pins 40 are inserted in the respective hooks 38. A fastener, for example, a self-locking, self-tapping sheet metal screw 52 may be used to fasten together the adjacent closures. A benefit of this embodiment is that this fastener is not required for the structural strength of the module-to-module joint and merely serves to align the modules vertically. The fasteners may therefore be less costly, simpler, fewer and smaller.

Figure 4:
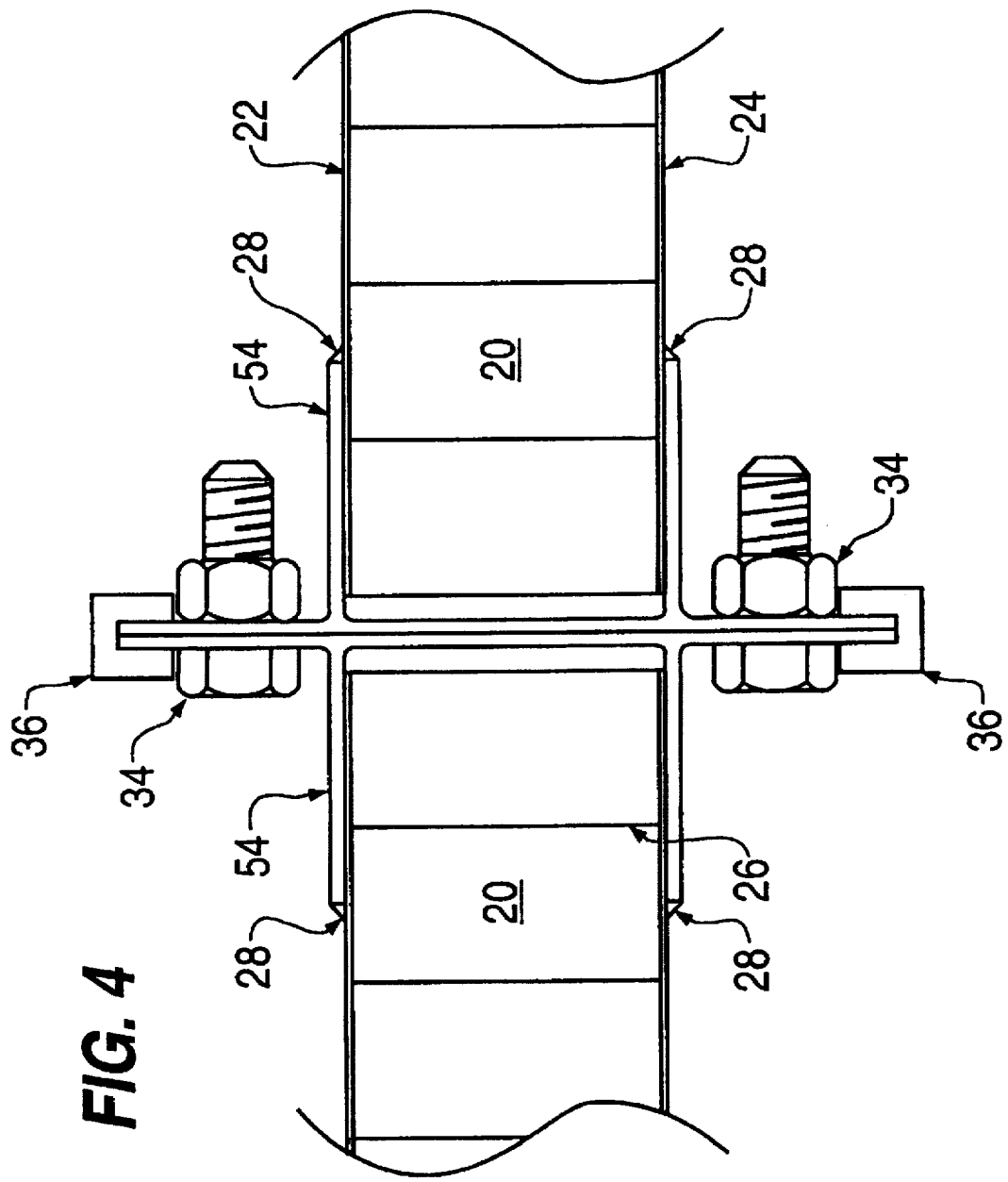
FIG. 4 shows a fourth embodiment of the invention.

FIG. 4 shows a fourth embodiment of the invention. The closures 54, 54 in this embodiment do not include a hook. Rather, the closures are fastened together by, for example, stainless steel bolts 34 located above and below the panels 20. Optionally, cap channels 36 may be placed over the closures 54, 54 at one or both ends of the vertical sections. If one or both of the cap channels are of sufficient strength, the bolts 34 may not be needed.

Figure 5:
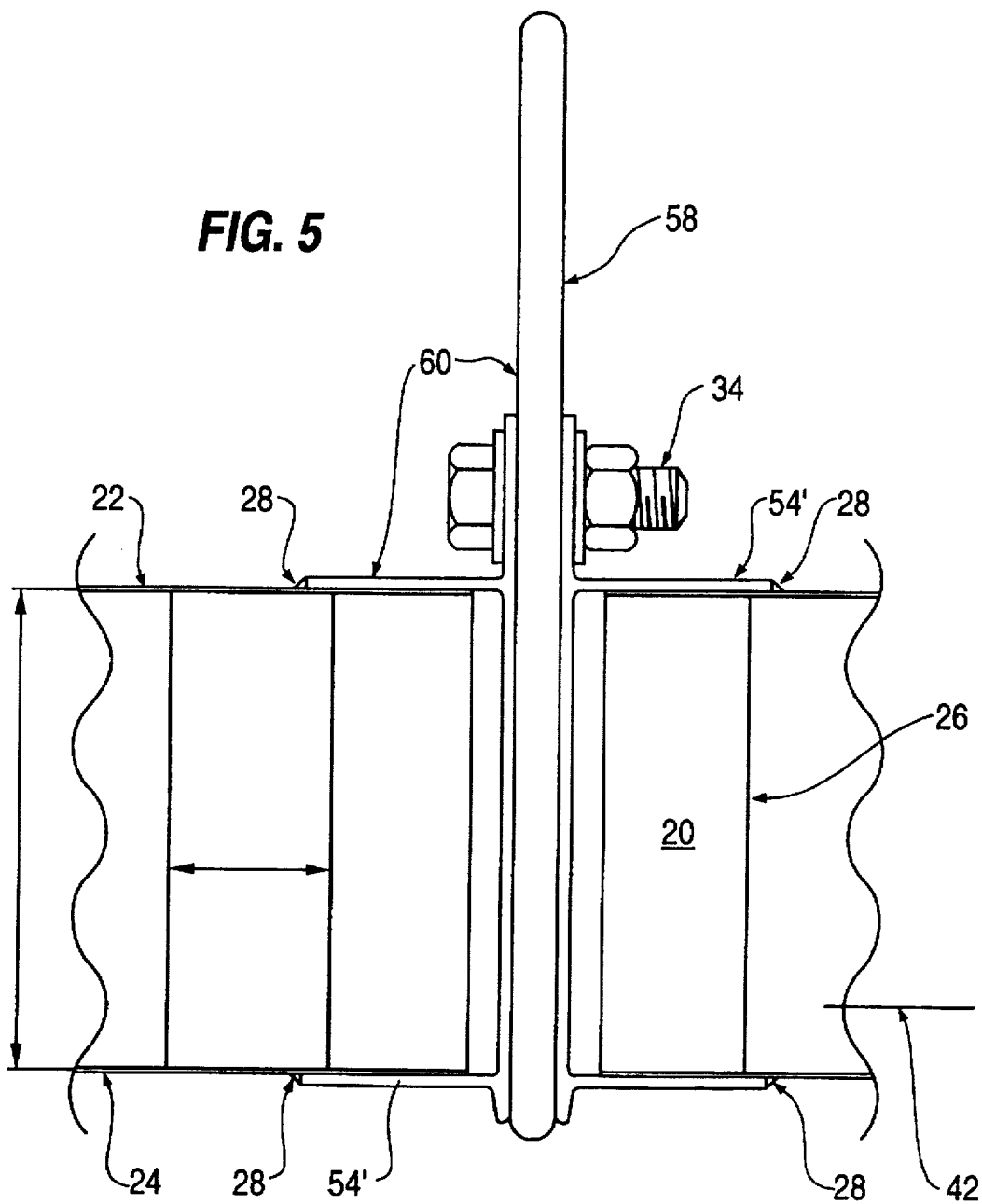
FIG. 5 shows a fifth embodiment of the invention.

FIG. 5 shows a fifth embodiment of the invention. The closures 54', 54' of this embodiment are similar to those of the fourth embodiment except they do not extend as far below the lower skin 24. A midbeam 58 is inserted between the closures 54', 54' to add structural strength to the floating roof. The midbeam 58 may be an extruded bar, for example, ¼" by 7", or could be a channel or I-beam shape. A protective coating 60, for example, urethane may be applied to the surfaces of the panels 20, closures 54' and midbeam 58 prior to assembly to further guard against attack from chemically active stored product. Note the product level at 42.

Figure 6:
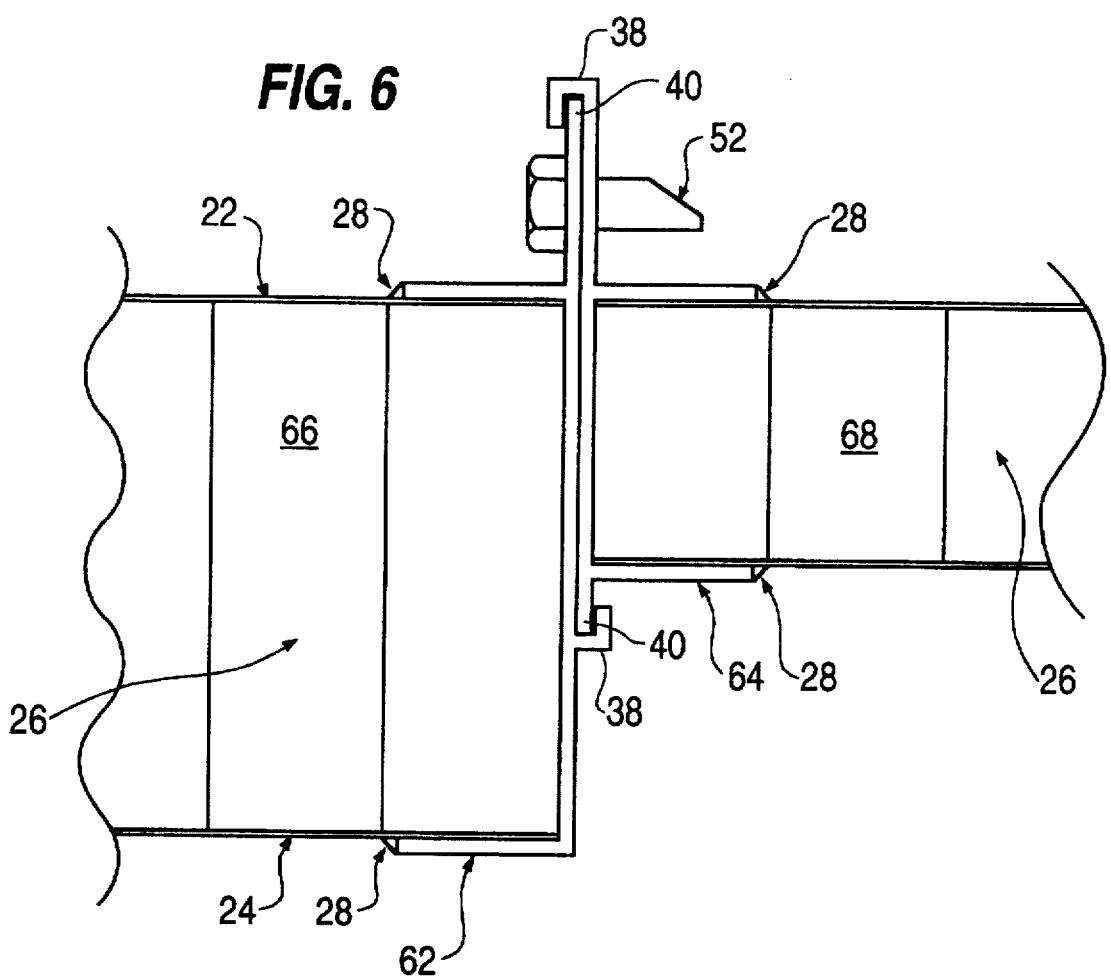
FIG. 6 shows a sixth embodiment of the invention.

FIG. 6 shows a sixth embodiment of the invention. In this embodiment, a panel 66, for example, a 3" panel is joined to a thinner panel 68, for example, a 1½" panel. A closure 62 having a hook 38 and a pin 40 is welded to the panel 66 and a closure 64 having a hook 38 and a pin 40 is welded to the panel 68. The closures 62, 64 are joined by fasteners, for example, self-locking, self-tapping sheet metal screws 52. The pins 40 of the closures 62, 64 are inserted into the respective hooks 38. This design is especially effective where a thicker panel 66 is desired around the periphery of the floating roof to add extra buoyancy to accommodate edge loading.

Figure 7:
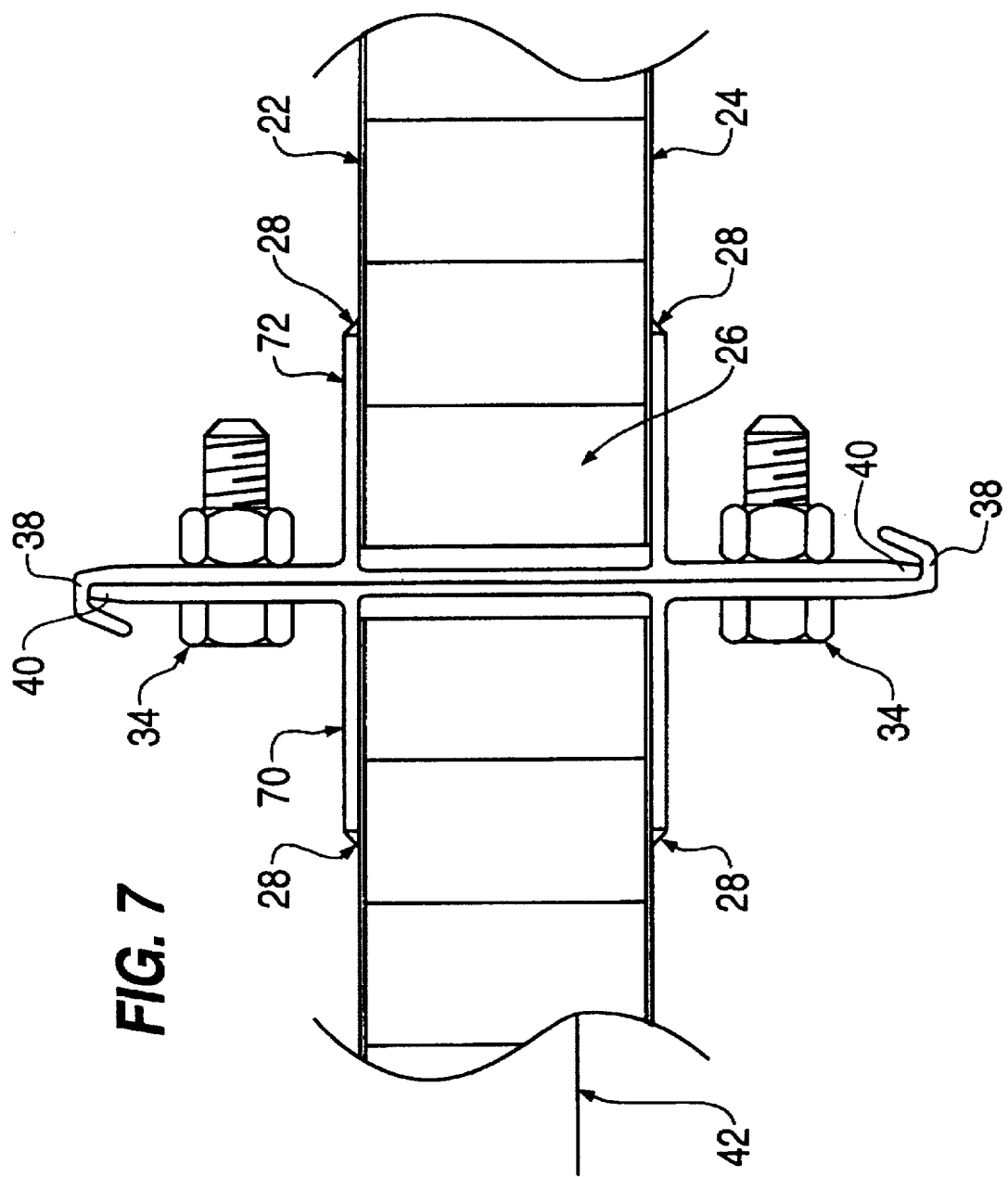
FIG. 7 shows a seventh embodiment of the invention.

FIG. 7 shows a seventh embodiment of the invention showing a closure 70 having a hook 38 at the bottom and a pin 40 at the top and a closure 72 having a pin 40 at the bottom and a hook 38 at the top. The closures 70, 72 include fasteners, for example, stainless steel bolts 34 at portions both above the upper skin 22 and below the lower skin 24.

Figure 8:
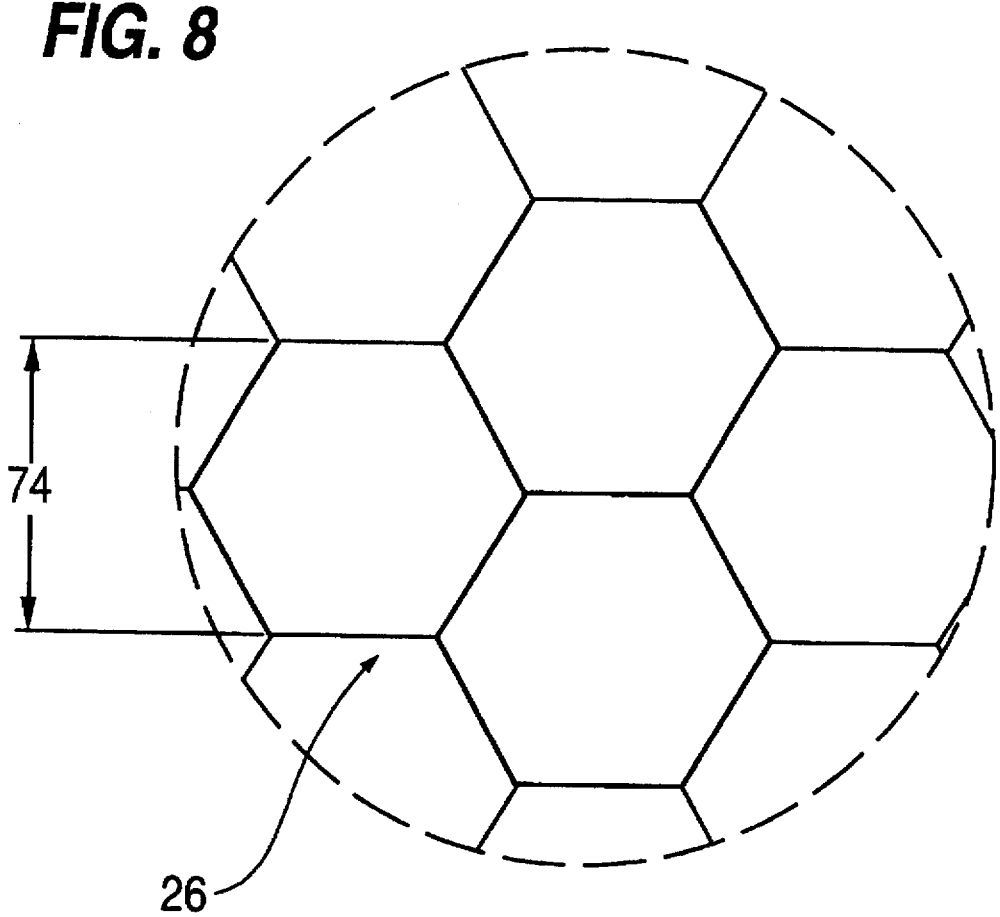
FIG. 8 is a fragmentary sectional view taken along the line 8—8 in FIG. 1.

FIG. 8 is a fragmentary sectional view taken along the line 8—8 of FIG. 1 showing a portion of a honeycomb core 26. The size of a single cell is shown by the dimension 74. The dimension 74 is preferably between ¾" and 1".

Figure 9:
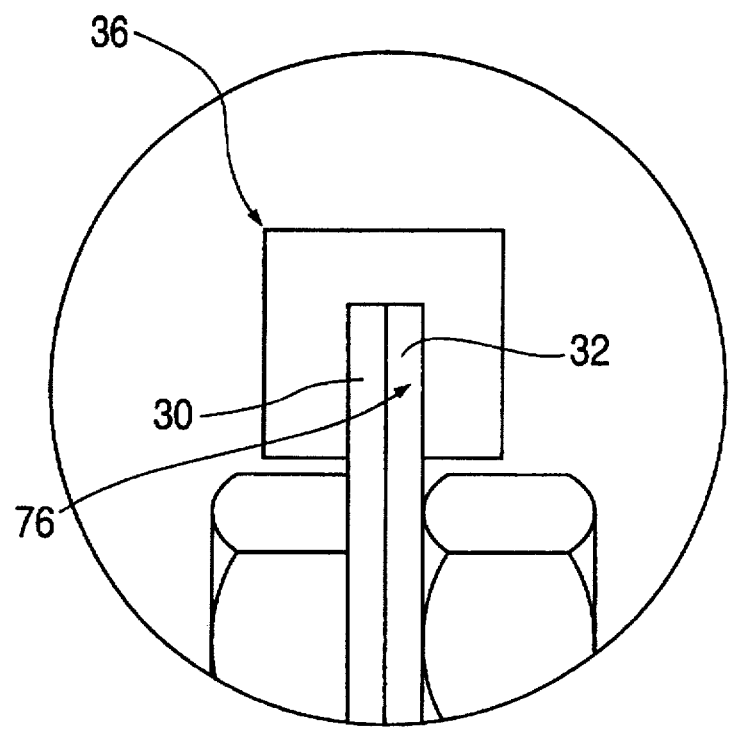
FIG. 9 is an enlarged view of the cap channel of FIG. 1.

FIG. 9 is an enlarged view of the cap channel 36 of FIG. 1. Reference numeral 76 refers to the tight fit between the closures 30, 32 and the cap channel 36.

Figure 10:
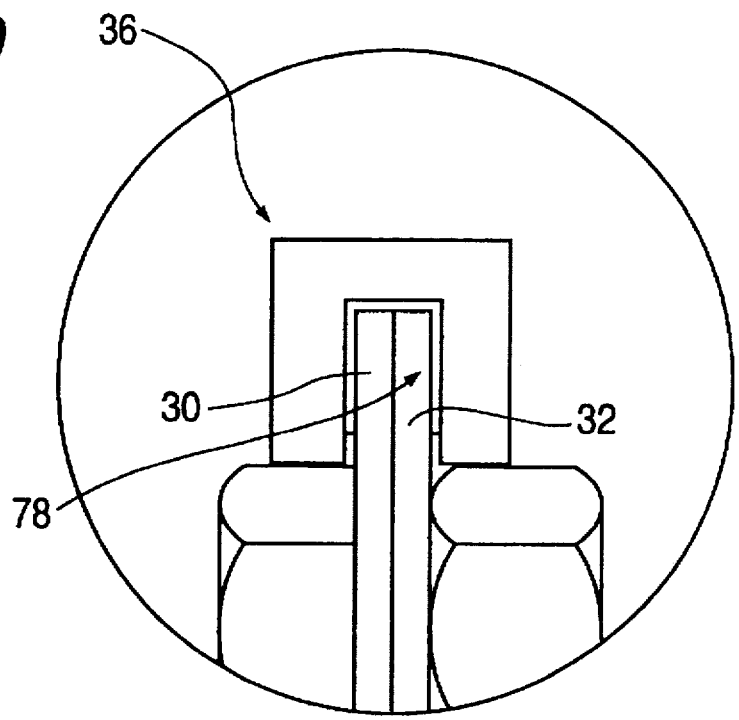
FIG. 10 is an enlarged view of a cap channel showing a gasket placed therein.

FIG. 10 is a view similar to FIG. 9 but also showing a gasket 78 interposed between the cap channel 36 and the closures 30, 32. The gasket may be made of, for example, silicone, urethane, neoprene, surlyn, teflon or other suitable materials, preferably elastomeric.

Figure 11:
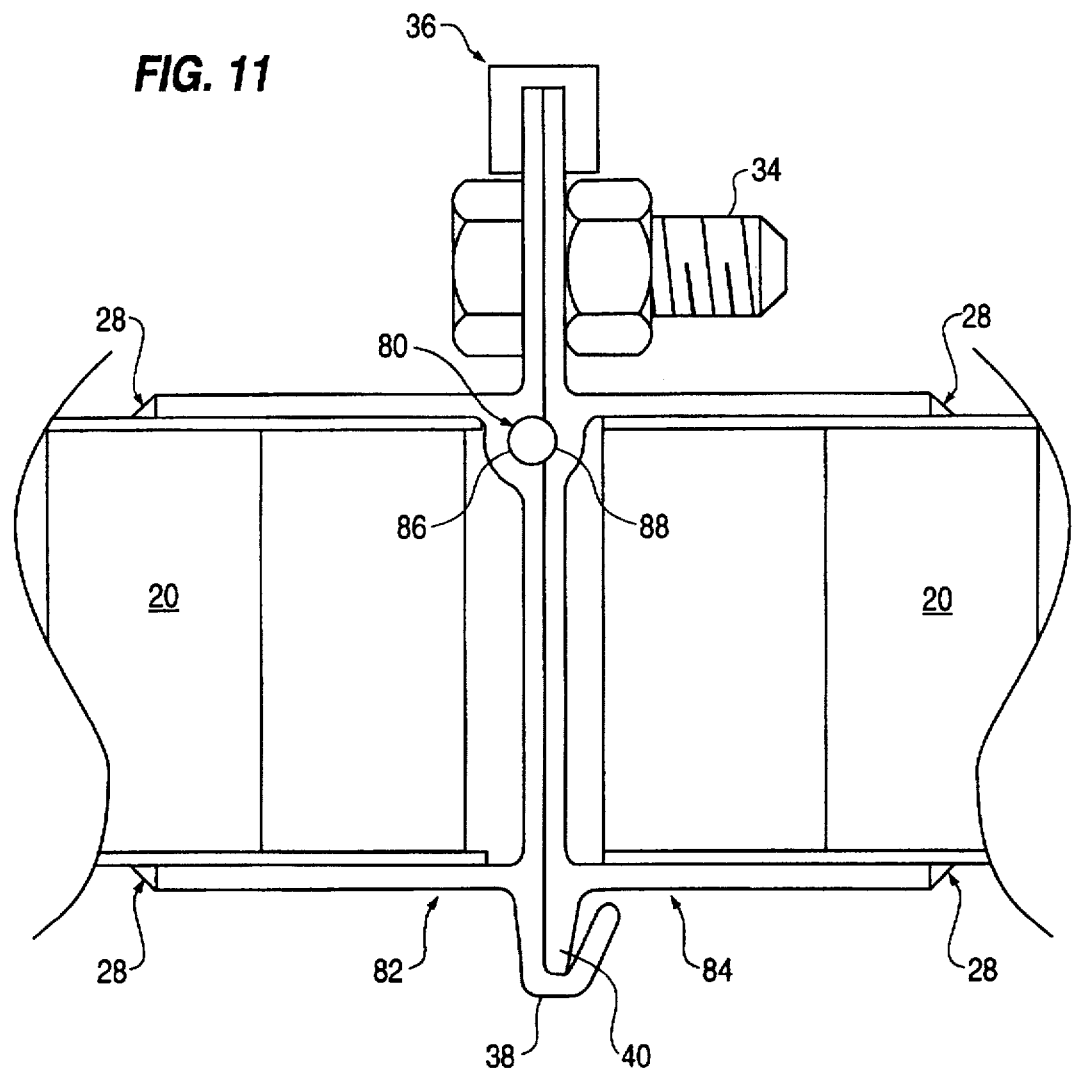
FIG. 11 shows an eighth embodiment of the invention.

FIG. 11 shows an eighth embodiment of the invention. In this embodiment, the closure 82 is provided with a hook 38 and a recess 86. The closure 84 is provided with a pin 40 and a recess 88. The recesses 86, 88 receive a gasket 80, for example, silicon, for sealing the joint between the closures 82, 84. As shown in FIG. 11, ⅔ of the gasket 80 may be received in the recess 86 and the remaining ⅓ may be received in the recess 88.

Figure 12:
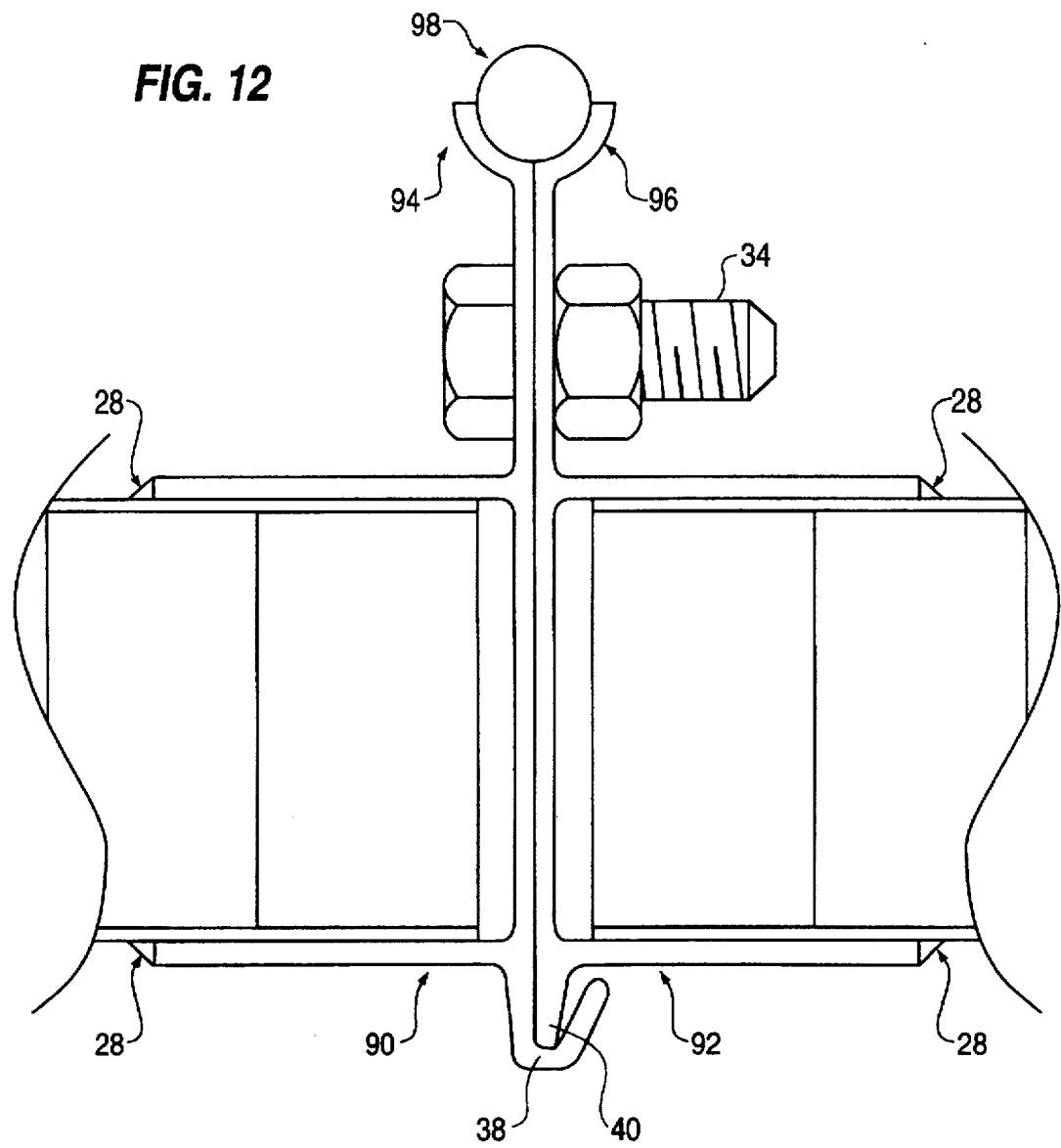
FIG. 12 shows a ninth embodiment of the invention.

FIG. 12 shows a ninth embodiment of the invention. In this embodiment, the closure 90 is provided with a hook 38 and an extended vertical section above the upper skin 22 which terminates in a one-half reservoir shape 94. The closure 92 includes a pin 40 at the bottom thereof and the upper end of the vertical section terminates in a one-half reservoir 96. When the closures 90, 92 are joined, the one-half reservoirs 94, 96 form a full reservoir for field application of a sealant 98 made of, for example, silicone, urethane, Thiokol or other suitable material.

Figure 13:
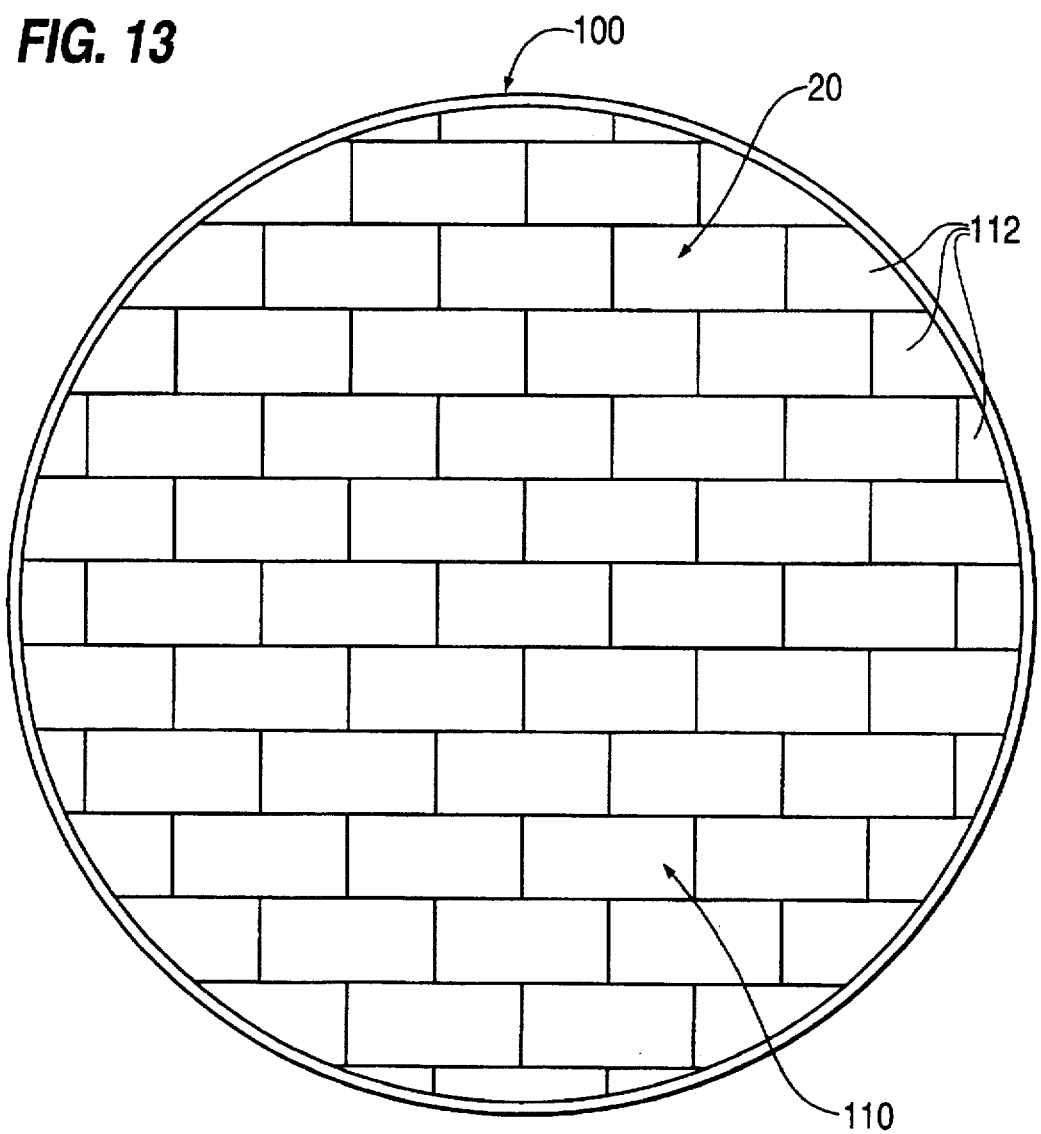
FIG. 13 shows a running-brick pattern of panels.

FIG. 13 shows a full contact floating roof 110 in plan view wherein the panels 20 are arranged in a running-brick type of pattern. The floating roof 110 does not directly abut against the vessel wall 100. Various types of seals are available for sealing the gap (not shown) which is present between the outer periphery of the roof 110 and the vessel wall 100. The outer panels 112 which form the periphery of the roof 110 are not standard size panels. The outer panels 112 are preferably shop cut to the appropriate shape and have closures of a similar design welded thereto in a similar manner as a standard panel 20.

Figure 14:
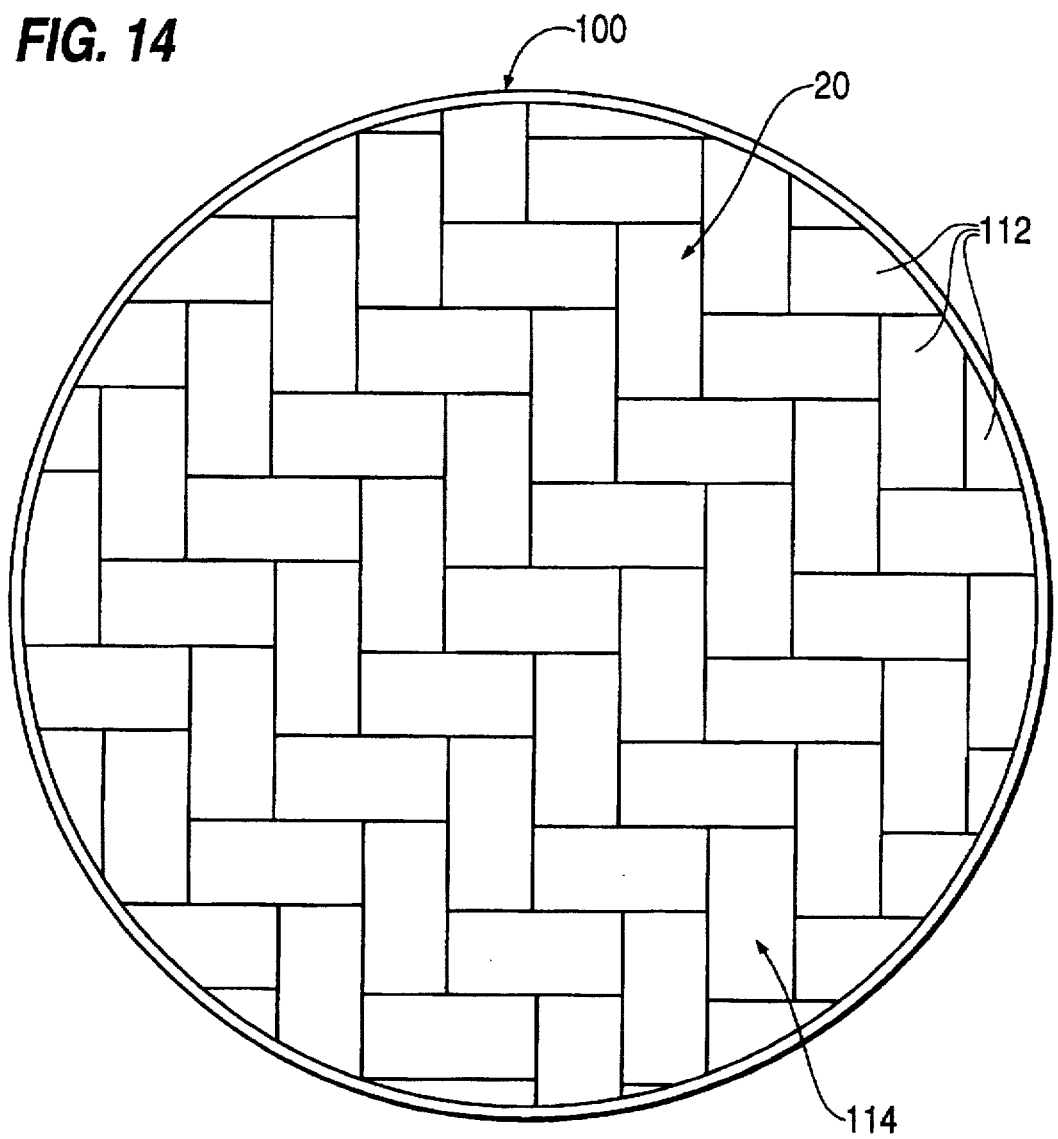
FIG. 14 shows a herringbone pattern of panels.

FIG. 14 shows floating roof 114 for a generally circular vessel with a vessel wall 100. The floating roof 114 is comprised of panels 20 interconnected in a herringbone-type pattern and includes outer panels 112 at the periphery thereof.

Figure 15:
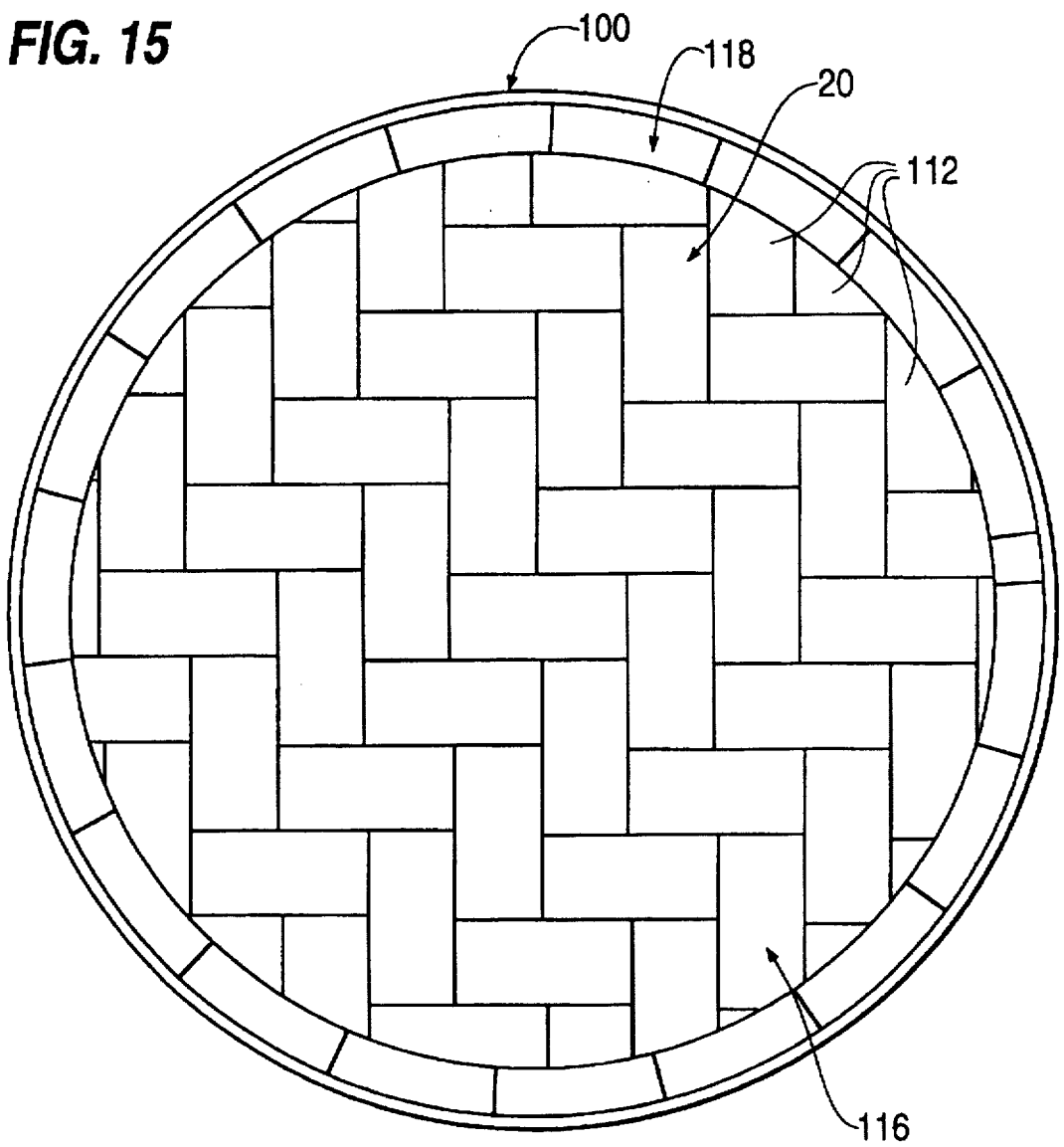
FIG. 15 shows a herringbone pattern of panels with thicker annular panels.

FIG. 15 shows a full contact floating roof 116 comprised of panels 20 arranged in a herringbone-type pattern with outer panels 112. Roof 116 also includes an annular periphery of panels 118 having a thickness greater than the thickness of the panels 20. The thicker panels 118 increase the buoyancy of the roof 116 at its periphery thereby compensating for any edge loading which may occur.

Figure 16:
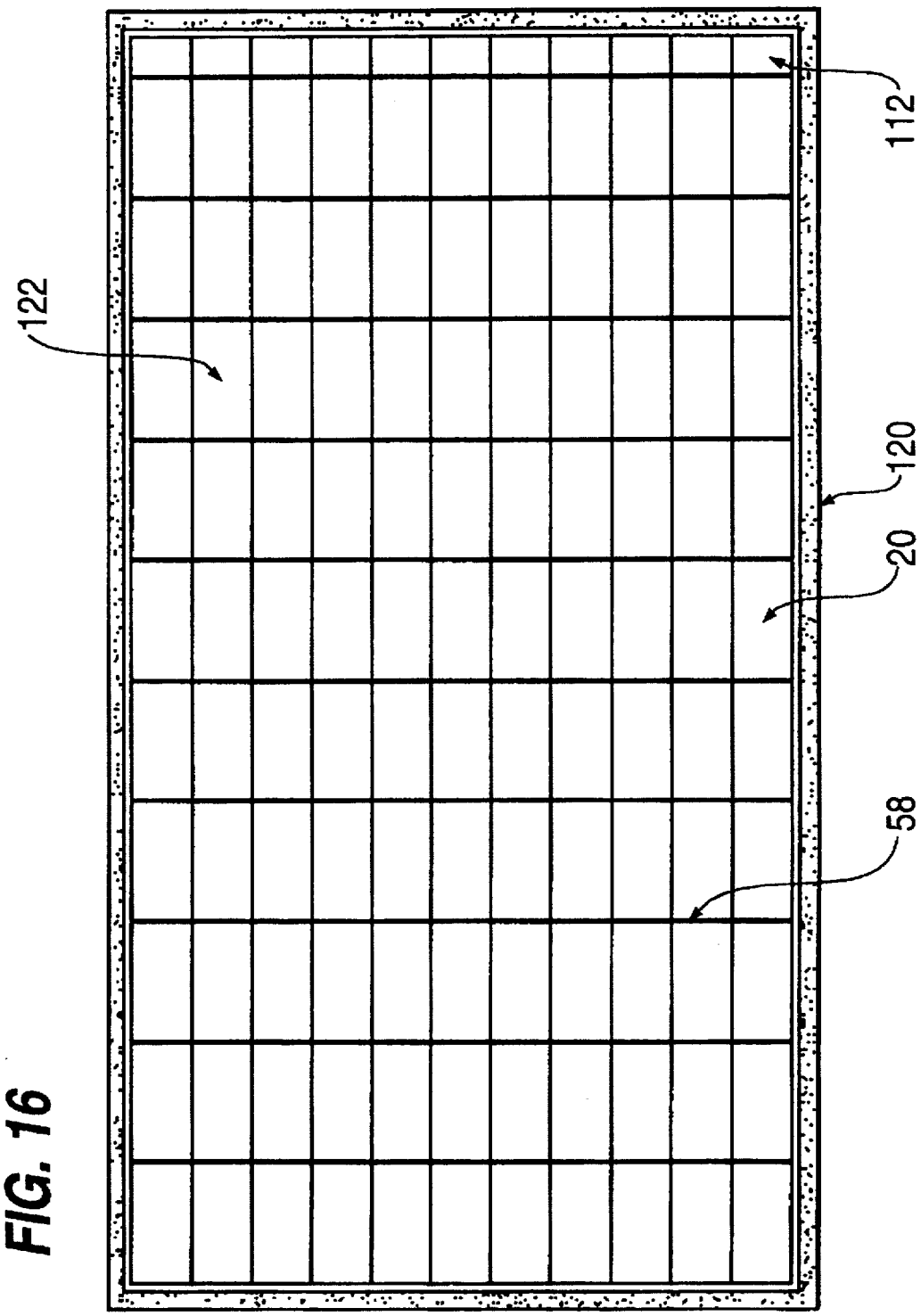
FIG. 16 shows a rectangular shaped roof with midbeams.

FIG. 16 shows a rectangular vessel 120 having a rectangular floating roof 122 comprised of standard panels 20 and custom size panels 112. The panels 20 which comprise the roof 122 are arranged in a row and column type of format. As shown in FIG. 16, the columns of the panels 20 are separated by midbeams 58 between adjacent closures (See FIG. 5). The midbeams 58 add strength to the roof 122. Alternatively, the midbeams 58 could be arranged between the rows of the roof 122 or between both the rows and columns of the roof 122.

Figure 17:
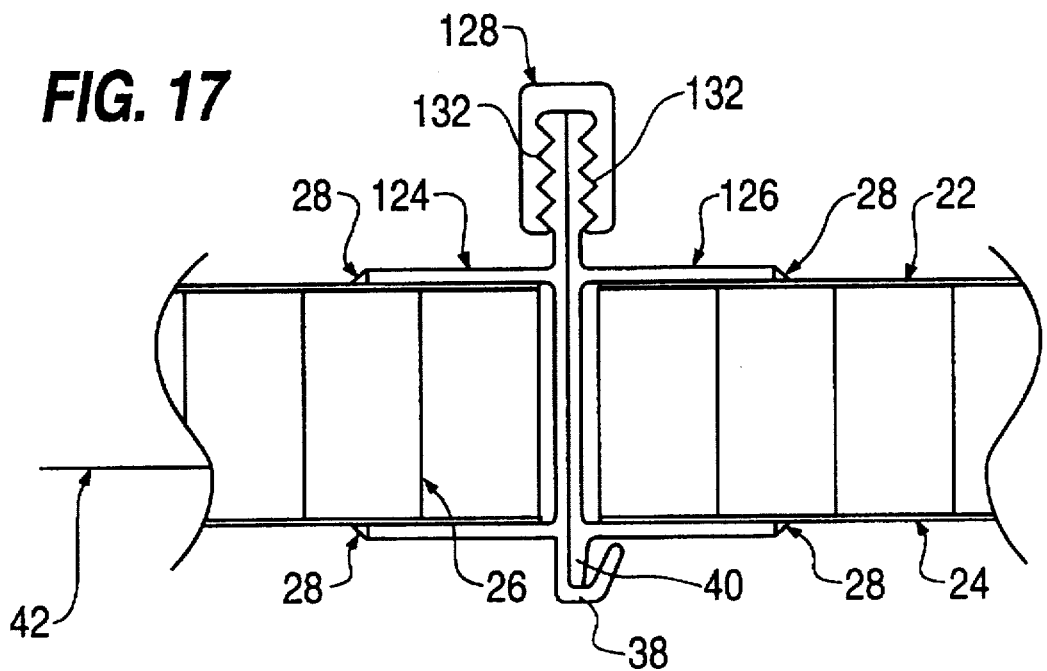
FIGS. 17 and 18 show a tenth embodiment of the invention.
Figure 18:
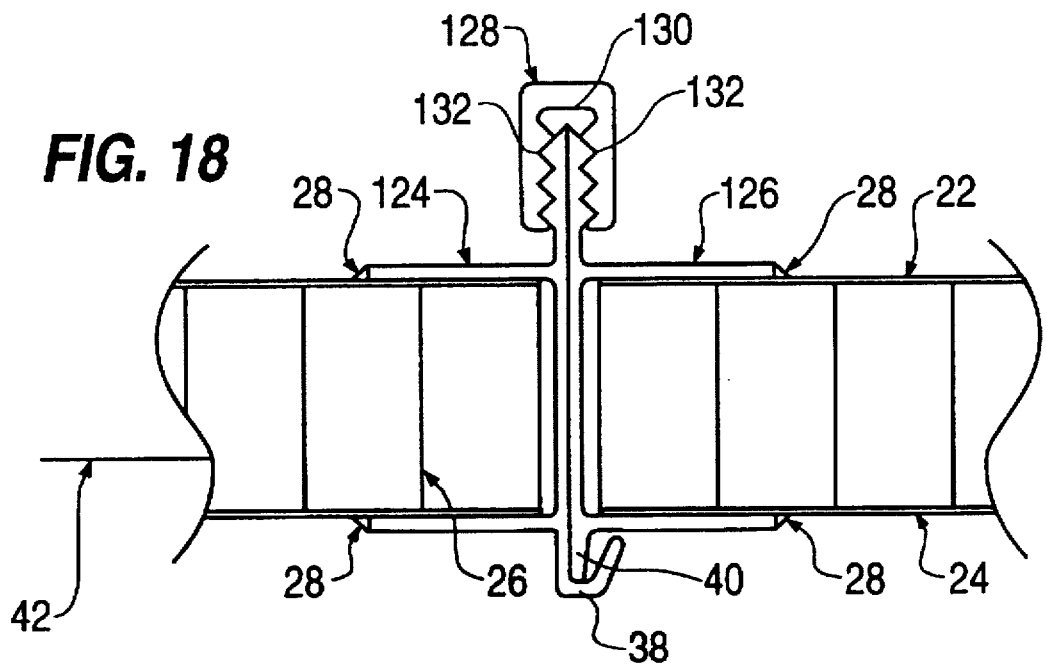

FIGS. 17 and 18 show a tenth embodiment of the invention including closure 124 having a hook 38 at its bottom end and a serrated edge 132 at its upper end. Closure 126 has a pin 40 at its bottom end and a serrated edge 132 at its upper end. The closures 124, 126 are joined together by a serrated cap channel 128, which functions as a "fastener" as that term is used in the claims. FIG. 18 shows a gasket 130 interposed between the serrated cap channel 128 and the serrations 132 of the closures 124, 126. The gasket 130 may be made of, for example, silicon, urethane, neoprene, surlyn, teflon or other suitable materials, preferably elastomeric.

While the invention has been described with reference to certain embodiments, it is evident that numerous alterations, modifications and combinations of the disclosed features may be made without departing from the spirit and scope of the invention, as defined in the appended claims and equivalents thereof.

Alternate panel constructions include a foam or wood core; panels of varying lengths, widths and thicknesses; varying degrees of extension of the closures above the panels, and panels with skin other than aluminum, for example, steel, stainless steel, fiberglass or plastic.

What is claimed is:

1. A full contact floating roof, comprising:
   a plurality of panels, each panel comprising a core disposed between upper and lower skins;
   a plurality of closures, each closure having a plate-like vertical section and two spaced-apart horizontal sections extending perpendicular to the vertical section; and
   a plurality of fasteners for connecting adjacent closures;
   wherein each closure is secured to perimeter edges of one of the panels by sealing engagement of at least one of the horizontal sections to at least one of the upper and lower skins; and
   wherein adjacent closures are held in abutting arrangement.

2. The roof of claim 1, wherein each vertical section extends above the upper skin and below the lower skin and each horizontal section extends substantially parallel to one of the upper and lower skin.

3. The roof of claim 1, wherein the plurality of closures includes a first and second plurality of closures, each closure of the first plurality of closures having a hook in a portion of the vertical section that extends below the lower skin, each closure of the second plurality of closures having a pin in a portion of the vertical section that extends below the lower skin wherein the pin is disposed in the hook.

4. The roof of claim 3, wherein the fasteners extend through a portion of the vertical section that extends above the upper skin.

5. The roof of claim 4, further comprising a cap channel fitted over portions of the vertical sections of the adjacent closures which extend above the upper skin.

6. The roof of claim 5, further comprising a gasket disposed between the cap channel and the closures.

7. The roof of claim 3, wherein each closure of the first plurality of closures includes a second pin in the portion of the section that extends above the upper skin and each closure of the second plurality of closures includes a second hook in the portion of the vertical section that extends above the upper skin and wherein the second pin is disposed in the second hook.

8. The roof of claim 7, wherein the fasteners include a first plurality of fasteners and a second plurality of fasteners, and the first plurality of fasteners extend through a portion of the vertical section that extends above the upper skin.

9. The roof of claim 8, wherein the second plurality of fasteners extend through a portion of the vertical section that extends below the lower skin.

10. The roof of claim 4, wherein the vertical section of each of the plurality of closures includes a recess formed therein for receiving part of a gasket.

11. The roof of claim 10, wherein the recess of one of the first and second plurality of closures is of a size to receive one third of the gasket and the recess of the other of the first and second plurality of closures is of a size to receive two thirds of the gasket.

12. The roof of claim 4, wherein an upper end of the vertical section of each of the plurality of closures terminates in a one half shape of a sealant reservoir whereby upper ends of the vertical sections of the adjacent closures form a sealant reservoir.

13. The roof of claim 1, wherein the fasteners include a first plurality of fasteners and a second plurality of fasteners, and the first plurality of fasteners extend through a portion of the vertical section that extends above the upper skin.

14. The roof of claim 13, wherein the second plurality of fasteners extend through a portion of the vertical section that extends below the lower skin.

15. The roof of claim 14, further comprising a cap channel fitted over portions of the vertical sections of the adjacent closures which extend above the upper skin.

16. The roof of claim 14, further comprising a cap channel fitted over portions of the vertical closures of the adjacent closures which extend below the lower skin.

17. The roof of claim 13, further comprising a midbeam disposed between vertical sections of the adjacent closures wherein the fasteners extend through the midbeam.

18. The roof of claim 17, wherein the midbeam extends vertically above the vertical sections of the adjacent closures.

19. The roof of claim 18, further comprising a protective coating applied to external surfaces of the panels, the closures and the midbeam.

20. The roof of claim 13, wherein the plurality of panels includes a first and a second plurality of panels and wherein a thickness of the first plurality of panels is greater than a thickness of the second plurality of panels.

21. The roof of claim 13, wherein the roof is rectangular, the plurality of panels are rectangular and arranged in rows and columns, and one of the rows and columns are separated by a plurality of midbeams disposed between vertical sections of adjacent closures.

22. The roof of claim 1, wherein the core of each panel comprises honeycomb type cells.

23. The roof of claim 1, wherein the plurality of panels are connected in a running-brick pattern.

24. The roof of claim 1, wherein the plurality of panels are connected in a herringbone pattern.

25. The roof of claim 1, wherein the plurality of panels includes a first plurality of panels of a first thickness and a second plurality of panels of a second thickness which is greater than the first thickness and wherein the second plurality of panels are arranged around a perimeter of the first plurality of panels.

26. The roof of claim 25, wherein the first plurality of panels are arranged in a herringbone pattern.

27. The roof of claim 1, wherein said sealing engagement is effected by welding.

28. A method of making a full contact floating roof for a vessel, comprising the steps of:

providing a plurality of panels, each panel comprising a core disposed between upper and lower skins;

providing a plurality of closures, each closure having a plate-like vertical section and two spaced-apart horizontal sections extending perpendicular to the vertical section;

securing the closures to perimeter edges of the panels by sealing engagement of at least one of the horizontal sections to at least one of the upper and lower skins; and connecting together the plurality of panels by fastening adjacent closures such that adjacent closures are held in abutting arrangement.

29. The method of claim 28, wherein the securing step is performed external to the vessel and the connecting step is performed inside the vessel.

30. The method of claim 29, wherein the connecting step includes fastening the adjacent closures through portions of the vertical sections that extend above the upper skin.

31. The method of claim 30, wherein the connecting step includes fastening the adjacent closures through portions of the vertical sections that extend below the lower skin.

32. The method of claim 29, wherein the connecting step includes placing a midbeam between the vertical sections of the adjacent closures.

33. The method of claim 32, further comprising the step of applying a protective coating to external surfaces of the panels, the closures and the midbeams.

34. The method of claim 28, wherein the connecting step includes connecting the plurality of panels in a running-brick pattern.

35. The method of claim 28, wherein the connecting step includes connecting the plurality of panels in a herringbone pattern.

36. The method of claim 28, wherein the providing step includes providing a first plurality of panels of a first thickness and a second plurality of panels of a second thickness which is greater than the first thickness and wherein the connecting step includes connecting the second plurality of panels around a perimeter of the first plurality of panels.

37. The method of claim 36, wherein the connecting step includes connecting the first plurality of panels in a herringbone pattern.

38. The method of claim 28, wherein the vessel is rectangular, the providing step includes providing rectangular panels, and the connecting step includes connecting the panels in rows and columns and separating one of the rows and columns by placing midbeams between vertical sections of the adjacent closures.

39. The method of claim 28, wherein said sealing engagement is effected by welding.

40. A full contact floating roof, comprising:

a plurality of panels, each panel comprising a core disposed between upper and lower skins;

a plurality of closures, each closure having a plate-like vertical section and two spaced-apart horizontal sections extending perpendicular to the vertical section; and a cap channel for connecting adjacent closures such that adjacent closures are held in abutting arrangement;

wherein each closure is secured to perimeter edges of a panel by sealing engagement of at least one of the horizontal sections to at least one of the upper and lower skins.

41. The roof of claim 40, wherein each vertical section extends above the upper skin and below the lower skin and each horizontal section extends substantially parallel to one of the upper and lower skin.

42. The roof of claim 41, wherein an upper end of the vertical section includes a serrated edge.

43. The roof of claim 42, wherein the cap channel includes internal serrations.

44. The roof of claim 40, wherein said sealing engagement is effected by welding.

\* \* \* \* \*